United States Patent
Khajepour et al.

(10) Patent No.: US 8,672,335 B2
(45) Date of Patent: Mar. 18, 2014

(54) SUSPENSION SYSTEMS AND METHODS WITH INDEPENDENT STIFFNESS AND HEIGHT TUNING

(76) Inventors: Amir Khajepour, Waterloo (CA); Zhihong Yin, Waterloo (CA); Dongpu Cao, Montreal (CA); Babak Ebrahimi, Kitchener (CA)

(*) Notice: Subject to any disclaimer, the term of this patent is extended or adjusted under 35 U.S.C. 154(b) by 176 days.

(21) Appl. No.: 13/097,874

(22) Filed: Apr. 29, 2011

(65) Prior Publication Data

US 2011/0266410 A1   Nov. 3, 2011

Related U.S. Application Data

(60) Provisional application No. 61/282,953, filed on Apr. 29, 2010.

(51) Int. Cl.
*B60G 17/052* (2006.01)
*B60G 17/056* (2006.01)

(52) U.S. Cl.
USPC ..................... 280/5.515; 280/5.514

(58) Field of Classification Search
USPC ............. 280/5.5, 5.504, 5.506, 5.507, 5.508, 280/5.513, 5.514, 5.515; 267/126
See application file for complete search history.

(56) References Cited

U.S. PATENT DOCUMENTS

| | | |
|---|---|---|
| 4,629,170 A | 12/1986 | Warmuth, II |
| 5,169,129 A | 12/1992 | Hoffman |
| 5,316,272 A * | 5/1994 | Davis ..................... 267/64.13 |
| 5,413,316 A | 5/1995 | Easter |
| 6,149,142 A | 11/2000 | Penzotti |
| 6,386,525 B1 | 5/2002 | Stuart |
| 6,416,044 B1 | 7/2002 | Warinner et al. |
| 6,691,989 B1 | 2/2004 | Leonard |
| 6,698,730 B2 | 3/2004 | Easter |
| 6,893,033 B2 | 5/2005 | Dean et al. |
| 6,923,434 B2 | 8/2005 | Schisler |
| 7,156,382 B2 | 1/2007 | Lloyd |
| 7,240,906 B2 | 7/2007 | Klees |
| 7,380,799 B2 | 6/2008 | Niaura et al. |
| 2004/0094929 A1 | 5/2004 | Ribi |
| 2005/0242532 A1 | 11/2005 | Deo et al. |
| 2007/0039790 A1 | 2/2007 | Timoney et al. |

FOREIGN PATENT DOCUMENTS

| | | |
|---|---|---|
| CA | 2295285 C | 11/2008 |
| EP | 1388442 B1 | 11/2006 |

OTHER PUBLICATIONS

Canadian Intellectual Property Office (ISA/CA), PCT Form PCT/ISA/210 International Search Report dated Aug. 4, 2011, International Application No. PCT/CA2011/050262, Quebec Canada.

(Continued)

*Primary Examiner* — Drew Brown
(74) *Attorney, Agent, or Firm* — Borden Ladner Gervais LLP; Neil Henderson (57) ABSTRACT

A suspension system between two bodies, the suspension system including: a first pressure chamber provided between the bodies; and at least one other pressure chamber provided between the bodies such that the at least one other pressure chamber opposes the action of the first pressure chamber; and a control system to control the pressure and volume in the first pressure chamber and the at least one other pressure chamber to adjust the stiffness value of the suspension system independently of adjusting a distance between the bodies.

9 Claims, 10 Drawing Sheets

(56) References Cited

OTHER PUBLICATIONS

Canadian Intellectual Property Office (ISA/CA), PCT Form PCT/ISA/237 Written Opinion of the International Searching Authority dated Aug. 4, 2011, International Application No. PCT/CA2011/050262, Quebec Canada.

Hendrickson USA, L.L.C., Comfort Air Single Axle Air Suspension Brochure, Mar. 2010, United States of America.

SAE International, Experimental and Analytical Property Characterization of a Self-Damped Pneumatic Suspension System, Oct. 5, 2010, SAE Digital Library.

* cited by examiner

SUSPENSION SYSTEMS AND METHODS WITH INDEPENDENT STIFFNESS AND HEIGHT TUNING

RELATED APPLICATIONS

This patent application claims priority on U.S. Provisional Patent Application 61/282,953 filed Apr. 29, 2010, which is hereby incorporated by reference.

FIELD

This application relates to suspension systems and in particular to pneumatic and hydro-pneumatic suspension systems with independent stiffness and height tunings.

BACKGROUND

Suspension systems are used in most ground vehicles and in many types of stationary equipment to reduce vibrations/shocks transmitted to a vehicle or equipment body from road/terrain/track or in general from the ground or a floor. In vehicles, a suspension system is used to enhance driver/passenger ride comfort, offer effective protection of cargo and also the vehicle chassis, improve vehicle road-holding and thus handling, and reduce road damage potential due to dynamic vehicle loadings. In equipment, suspension systems are used to reduce vibration transmission from the equipment to the ground, and also isolate the equipment from any ground vibrations. In vehicles however, a suspension system typically has to be compromised among different performance measures associated with vehicle ride, handling, roll and directional stabilities, design space and energy consumption.

Although considerable progress has been made in developing suspension systems, there is still a general need for improved systems and in particular for a system that provides independent control of properties such as stiffness and ride height in an efficient manner.

SUMMARY

According to an aspect herein, there is provided a suspension system between two bodies, the suspension system including: a first pressure chamber provided between the bodies; and at least one other pressure chamber provided between the bodies such that the at least one other pressure chamber opposes the action of the first pressure chamber; and a control system to control the pressure and volume in the first pressure chamber and the at least one other pressure chamber to adjust the stiffness value of the suspension system independently of adjusting a distance between the bodies.

In a particular case, the pressure and volume in the first pressure chamber and the at least one other pressure chamber may be independently controlled by the control system.

In another particular case, the first pressure chamber and the at least one other pressure chamber may be pneumatic chambers and the control system includes at least one regulator and a gas supply for controlling the pressure and volume in the pneumatic chambers.

In yet another particular case, the suspension system may further include: a gas accumulator; and a valve for controlling the flow of gas between the pressure chamber and the gas accumulator for damping motion of the two bodies. In this case, the valve may include a variable valve controlled by the control system to adjust the dampening characteristics according to desired performance.

In still yet another particular case, the suspension system may further include: a sensor in communication with the first pressure chamber and the at least one other pressure chamber for detecting pressure values; and wherein the control system further monitors the detected pressure values and determines an appropriate pressure and volume for each pressure chamber to achieve a desired stiffness value or nominal distance between bodies for the suspension system.

In another particular case, the first pressure chamber and the at least one other pressure chamber may be positioned in-line with one another and with a piston separating the two chambers.

In yet another particular case, the first pressure chamber and the at least one other pressure chamber may be positioned on opposite sides of a lever and the lever and the first pressure chamber and the at least one other pressure chamber are positioned between the two bodies such that the lever pivots in relation to at least one of the two bodies.

In still another particular case, the at least one other pressure chamber may include left and right pressure chambers positioned on opposite sides of an axle.

According to another aspect herein, there is provided a suspension system between two bodies, the suspension system including: a first pressure chamber provided between the bodies; and at least one other pressure chamber provided between the bodies such that the at least one other pressure chamber opposes the action of the first pressure chamber; and a control system to control the pressure in the first pressure chamber and the at least one other pressure chamber to adjust the distance between the bodies independently of adjusting the stiffness value of the suspension system.

In a particular case, the pressure and volume in the first pressure chamber and the at least one other pressure chamber may be independently controlled by the control system.

According to yet another aspect herein, there is provided a suspension system between two bodies, the suspension system including: a first pressure chamber provided between the bodies, wherein the first pressure chamber comprises a first gas chamber and a first fluid chamber separated by a piston; and at least one other pressure chamber provided between the bodies, the other pressure chamber comprising a second gas chamber and a second fluid chamber, the at least one other pressure chamber configured such that the at least one other pressure chamber opposes the action of the first pressure chamber; and a control system to control the pressure in the first gas chamber and the second gas chamber to adjust the stiffness value of the suspension system independently of adjusting the distance between the bodies.

In a particular case, the suspension system may further include: a gas accumulator; and a valve for controlling the flow of gas between the pressure chamber and the gas accumulator for damping motion of the two bodies.

In another particular case, the valve may include a variable valve controlled by the control system to adjust the dampening characteristics according to desired performance.

According to still yet another aspect herein, there is provided a suspension system between two bodies, the suspension system including: first and second opposing-action suspensions, each of the first and second opposing-acting suspensions including: a first pressure chamber provided between the bodies; and at least one other pressure chamber provided between the bodies such that the at least one other pressure chamber opposes the action of the first pressure chamber; and a control system to control the pressure in the first pressure chamber and the at least one other pressure chamber to adjust the stiffness value of the suspension system independently of adjusting the distance between the bodies, wherein the first and second opposing-action suspensions are positioned in relation to the bodies and interconnected to provide control of roll or pitch of the bodies in relation to each other.

In a particular case, the first pressure chamber of the first opposing-action suspension may be fluidically connected with the at least one other pressure chamber of the second opposing-action suspension and the first pressure chamber of the second opposing-action suspension may be fluidically connected with the at least one other pressure chamber of the first opposing-action suspension.

In a particular case, the first pressure chamber of the first opposing-action suspension may be fluidically connected with the first pressure chamber of the second opposing-action suspension and the at least one other pressure chamber of the first opposing-action suspension may be fluidically connected with the at least one other pressure chamber of the second opposing-action suspension.

According to another aspect herein, there is provided a method of independently adjusting suspension stiffness and distance between two bodies, the method including: providing a first pressure chamber and at least one other pressure chamber between the bodies such that the at least one other pressure chamber opposes the action of the first pressure chamber; adjusting the pressure in the first pressure chamber and the at least one other pressure chamber to adjust the suspension stiffness; and adjusting the volume of the first pressure chamber and the at least one other pressure chamber to adjust the distance between the bodies.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides systems and methods for advanced suspension property tuning and dynamics control. Some embodiments relate to fluidic (either pneumatic or hydro-pneumatic) suspension systems. The embodiments herein aim to achieve an enhanced decoupling among different performance measures by independently tuning suspension stiffness and ride-height subject to different operating conditions. In a general sense, the system embodiments herein include at least two pneumatic chambers that are not fluidically connected to each other. The gas volume and pressure characteristics of these pneumatic chambers can be independently tuned through their own regulators via an external high-pressure gas supply system. By independently tuning both the volume and pressure of the gas in the two pneumatic chambers, desirable suspension stiffness properties and vehicle ride-height settings can be conveniently acquired for different vehicle operating conditions, such as vehicle loading, road roughness, forward speed, and the like.

The embodiments of the suspension systems disclosed herein are described using three general types: (1) pneumatic suspension (PS) systems; (2) hydro-pneumatic suspension (HPS) systems; and (3) interconnected pneumatic suspension (IPS) systems. While the embodiments are generally discussed for vehicles, it will be understood that the discussion is equally valid for the application of embodiments of the suspension systems and methods in stationary equipment/machines. Further, it will also be understood that the concepts may be applied in various types of suspension systems within and beyond the three general types described herein.

(1) Pneumatic Suspension (PS) System

Figure 1:
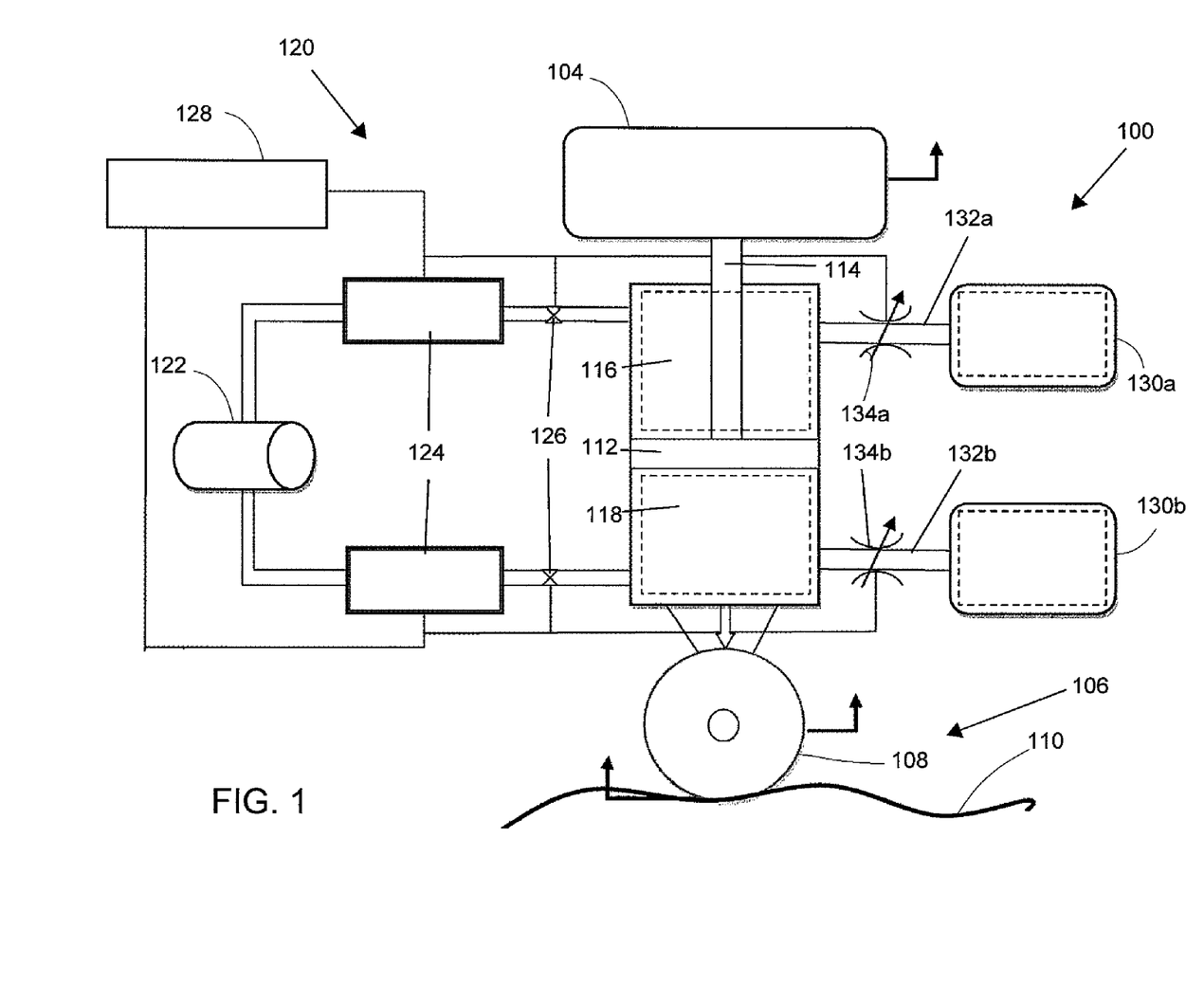
FIG. 1 is a schematic of a suspension system according to an embodiment herein.

FIG. 1 is a quarter-car schematic of an embodiment of a pneumatic suspension system 100 with independent stiffness and ride-height tuning. This system 100 consists of a pneumatic cylinder or strut 102 provided between a load 104 (sometimes called a sprung mass $M_s$) and a support 106 (sometimes called an unsprung mass $M_u$), such as a wheel 108 in contact with a ground surface 110. The pneumatic cylinder 102 includes a piston 112 that is connected to the load 104 by a piston rod 114. The pneumatic cylinder 102 also includes at least two chambers (a first chamber 116 and a second chamber 118 in FIG. 1) that for this example are positioned above and below the piston 112 to oppose each other's action providing a double-acting cylinder or strut. The pneumatic suspension system 100 further includes a regulating subsystem 120 that includes a high-pressure gas supply 122, such as a compressor or a pressurized gas tank, and a regulator or servo valve 124 for each of the gas chambers 116, 118. The regulating subsystem may also include a shut off valve 126 for each of the gas chambers 116, 118. The shutoff valves 126 may be internal or external. The regulating subsystem 120 also includes a control system including controller 128, such as a microprocessor, computer, control switch or the like, which controls the regulators 124 and valves 126. The regulating subsystem 120 may also include a set of sensors (not shown) for dynamically sensing the pressure in each of the first and second gas chambers 116, 118 as well as the ride height position of the load 104. By regulating the gas volume and pressure in each of the first and second chambers 116, 118, desirable suspension stiffness and vehicle ride-height can be achieved corresponding to vehicle operating conditions and overall suspension load. The pressure in the first and second chambers 116, 118 is intended to always satisfy the static vertical load on the suspension, for example, the pressure in each chamber can be increased or decreased appropriately to adjust the stiffness. The regulating subsystem 120 can tune the pressure and volume of the gas in the gas chambers 116, 118 when the vehicle is stationary and shut the valves 126 between the regulators 124 and gas chambers 116, 118 when the desired tuning is achieved. The pressure and volume of each gas chamber 116, 118 can be changed, for example, by opening the regulator 124, allowing the flow of air from the gas supply 122 into the corresponding gas chamber 116, 118. This allows off-line tuning of suspension stiffness and vehicle ride-height based on the vehicle load, road conditions, and driving preferences. It is also possible to perform the tuning while the vehicle is moving adaptively based on the driver preference or road conditions. This tuning is done by monitoring the average pressure in the gas chambers 116, 118 and also the average vehicle height, while comparing them with the desired values obtained form the driver preference or adaptively from sensors (not shown) such as accelerometers, cameras or the like that monitor road and vehicle conditions and the like. It will be understood that the controller 128 may make use of software, look-up tables or other methods for controlling the pressure and volume in each chamber 116, 118. The particular settings can be determined by one of skill in the art after having an understanding of the concepts described herein.

The system 100 may also include gas accumulators 130a, 130b, associated with some or all of the gas chambers 116, 118 depending upon the specific design requirements and applications. In FIG. 1, first and second gas accumulators 130a, 130b are connected to the first and second gas chambers 116, 118 through two pipes/tubes 132a, 132b with orifices 134a, 134b. In this example, each orifice 134a, 134b is configured to include a flow valve so that an effective area of the orifice 134a, 134b can be flexibly tuned to control suspension damping. Each variable orifice 134a, 134b can be controlled by the controller 128, as seen in FIG. 1.

The use of the gas accumulators 130a, 130b in the pneumatic suspension system 100 allows for pneumatic damping, with a potential remission or partial remission of hydraulic dampers. In the tuning of the suspension system 100, the regulators 124 and gas supply 122 can be used to adjust the average gas pressure and volume in combined first chamber 116 and first accumulator 130a and combined second chamber 118 and second accumulator 130b to set a desired stiffness and height. Once set, the shutoff valves 126 can be used to disconnect the gas chambers 116, 118 from the regulators 124 and gas supply 122.

Figure 2:
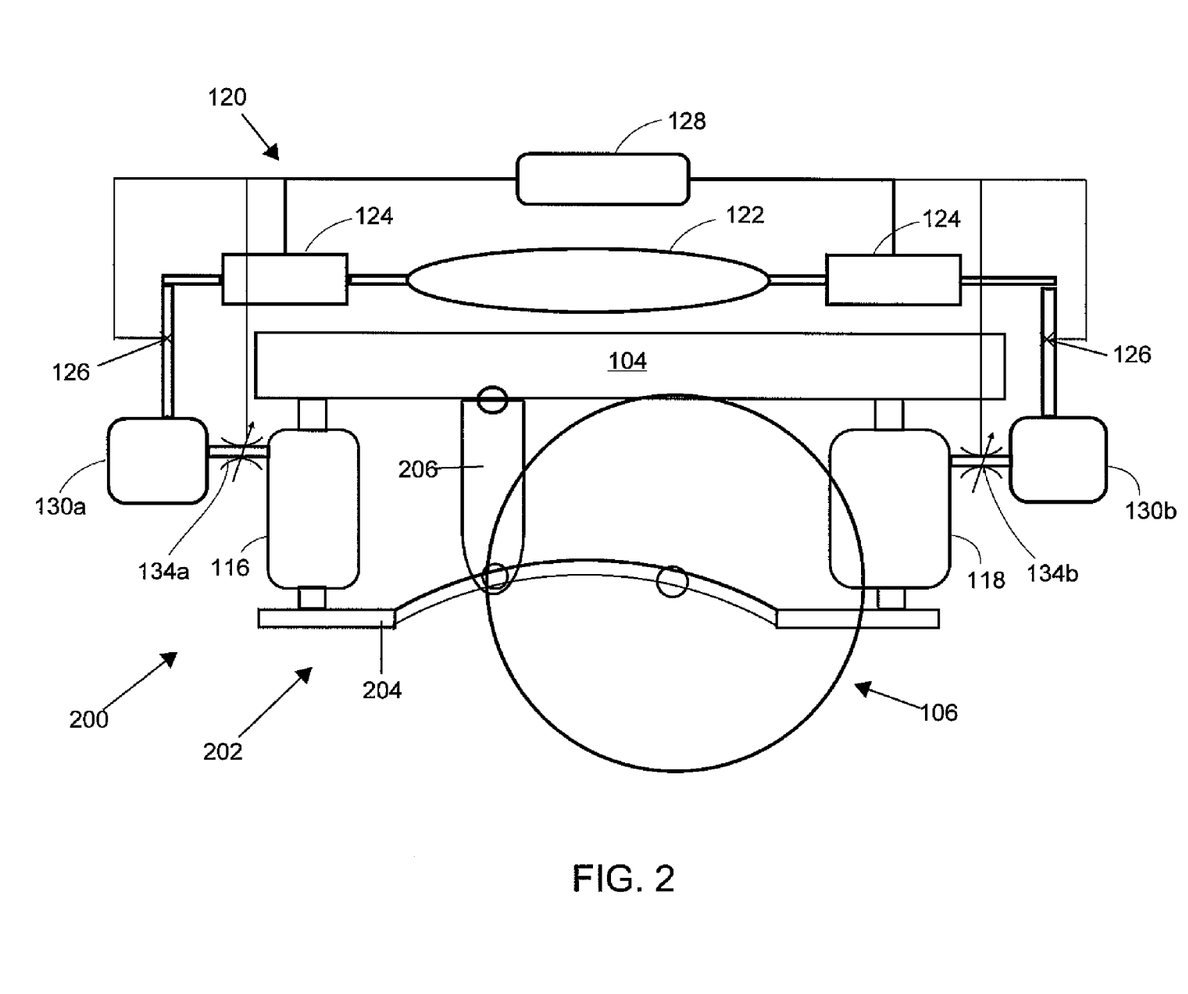
FIG. 2 is a schematic of a suspension system according to another embodiment herein.

FIG. 2 is a schematic based on a pitch-plane view of a quarter-vehicle model showing another embodiment of a pneumatic suspension system 200 with independent stiffness and ride-height tunings. In FIG. 2, similar elements are identified by similar reference numerals.

The pneumatic suspension system 200 includes separate first and second gas chambers 116, 118. In this case the gas chambers are shown as flexible air springs or commercially available air bags and it will be understood that the gas chambers referred to herein can take many forms. In general, each gas chamber is intended to act in a manner that is generally mathematically equivalent to a single-acting cylinder. Rather than being in a double-acting pneumatic cylinder such as that shown in FIG. 1, the gas chambers 116, 118 are connected to each other through a mechanical system 202 and, via the mechanical system 202, between a load 104 and a support 106 (tire/wheel system). The mechanical system 202 includes a lever 204 that is connected to the support 106 and the gas chambers 116, 118 are provided on opposite sides of the connection to the support 106. The mechanical system 202 also includes a load bracket 206 connecting the lever 204 to the load 104. The mechanical system is configured such that, in a relative suspension displacement, one air spring 116 will be compressed while the other air spring 118 will be extended. In this way, the air springs 116, 118 oppose each other's action similar to the suspension in FIG. 1. As in the embodiment of FIG. 1, a high-pressure gas supply 122 together with regulators/servo valves 124 and shut-off valves 126 are controlled by a controller 128 to tune the gas volume and pressure of each air spring 116, 118. Again, external accumulators 130a, 130b can also be used to provide a wide range of stiffness tuning and may include damping properties via orifices/flow valves 134a, 134b. In this case, the gas supply is connected to the gas chambers 116, 118 via the accumulators 130a, 130b.

Figure 3:
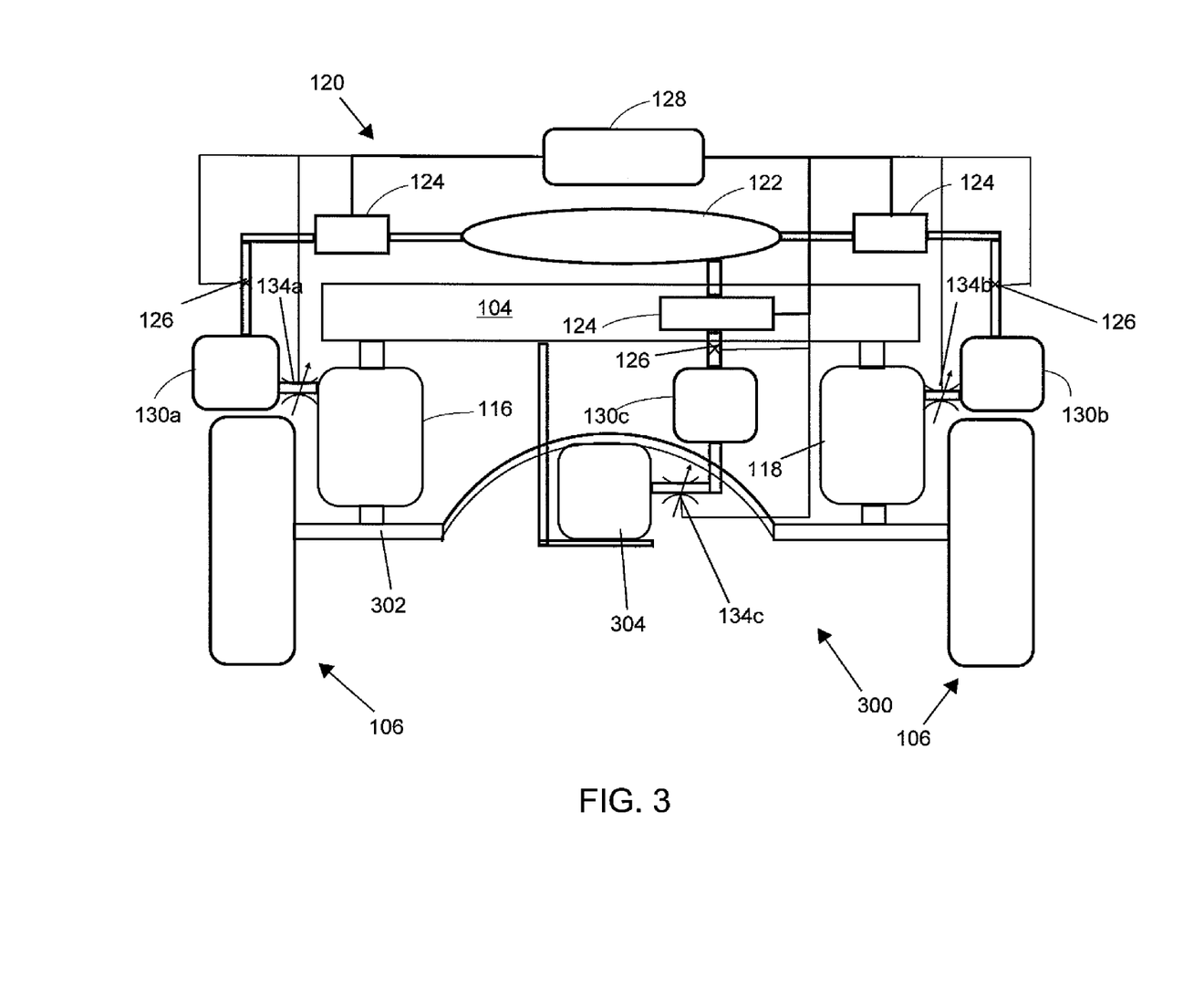
FIG. 3 is a schematic of a suspension system according to yet another embodiment herein.

FIG. 3 presents a schematic based on a roll-plane vehicle model of another embodiment of a pneumatic suspension system 300 with independent stiffness and ride-height tunings.

The pneumatic suspension system 300 includes first and second gas chambers 116, 118, in this case shown as air springs (or commercially available air bags), at the left and right sides of an axle 302. The gas chambers 116, 118 are connected to the load 104 and the axle 302. A third gas chamber 304 (shown as an air spring) is provided at the center of the axle 302 and connected between the load 104 and axle 302 in opposing relation to the first and second gas chambers 116, 118. As in embodiments above, a high-pressure gas supply 122 together with regulators/servo valves 124 and shut-off valves 126 are controlled by a controller 128 to tune the gas volume and pressure of each air spring 116, 118, 304. In this embodiment, the third gas chamber 304 is also provided with a regulator 124 and shut-off valve 126. For a given suspension displacement, the first and second gas chambers 116, 118 (left and right air springs) will be compressed/rebounded, while the third gas chamber 304 (center air spring) will be extended/compressed (opposing actions), providing a function similar to the suspension in FIGS. 1 and 2. Similar to the embodiments above, external accumulators 130a, 130b, including a third accumulator 130c for the third gas chamber 304, can also be used to provide a wide range of stiffness tuning and may include damping properties via orifices/damping valves 134a, 134b, including a third orifice/damping valve 134c for the third gas chamber 304.

(2) Hydro-Pneumatic Suspension (HPS) System

Figure 4:
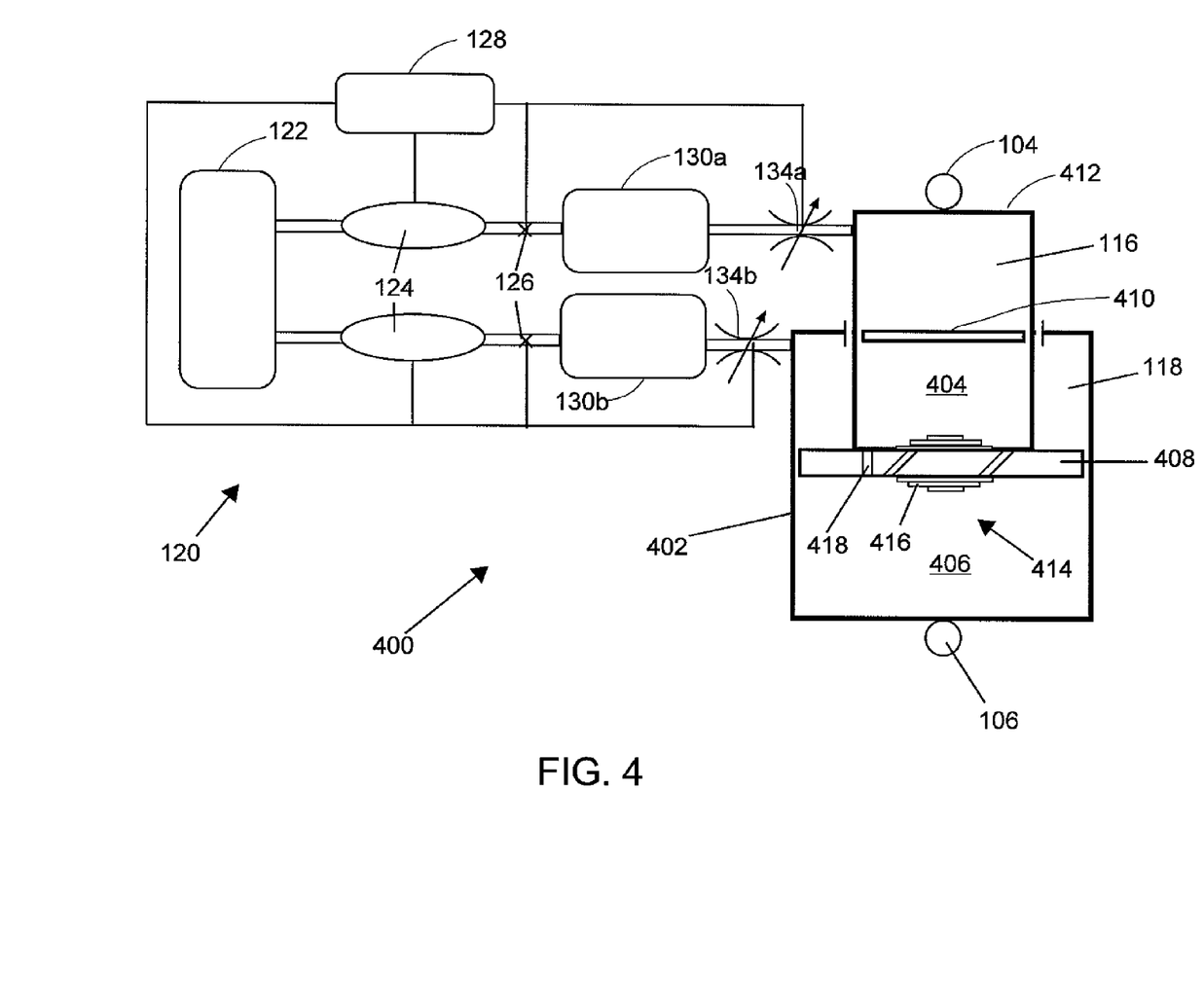
FIG. 4 is a schematic of a suspension system according to still yet another embodiment herein.

An embodiment of a hydro-pneumatic suspension system 400 with independent stiffness and ride-height tunings is schematically illustrated in FIG. 4. This suspension system 400 includes a hydro-pneumatic strut 402 that extends between a load 104 and a support system 106 (both load 104 and support system 106 are represented by circles in FIG. 4). The strut 402 includes first and second gas chambers 116, 118 and related first and second hydraulic fluid (oil) chambers 404, 406. The strut 402 is configured such that a main piston 408 separates the second gas chamber 118 from the second oil chamber 406, and a secondary piston 410 separates the first gas chamber 116 from the first oil chamber 404. The first gas chamber 116, secondary piston 410, and first oil chamber 404 are arranged adjacent to each other to act as a piston rod 412, extending from the main piston 408 through the second gas chamber 118 to the load 104. The first oil chamber 404 abuts the main piston 408 and is in fluid communication with the second oil chamber 406 via a damping system 414 provided through the main piston 410. This "cylinder-in-a-cylinder" design provides for a compact arrangement.

The damping system 414 can be similar to those used in commercial shock absorbers. However, in this particular example, the damping system 414 includes shim disc valves 416 in conjunction with constant area bleed orifices 418 to achieve variable flow resistance between the two hydraulic chambers and thus provide suspension damping. It will be understood that a gas damping system involving the gas chambers 116, 118 similar to other embodiments herein may also be incorporated either together with or as an alternative to the damping system 414. Such a gas damping system may be easier to control than the damping system 414 shown in FIG. 4, for example, in a situation where the suspension system is operating at different temperatures or the like.

With the arrangement of FIG. 4, under a suspension compression stroke, the gas in the first gas chamber 116 undergoes compression while the second gas chamber 118 undergoes expansion (opposing action). Similarly, the pressure in the second gas chamber 118 undergoes compression during a suspension rebound motion while the first gas chamber 116 undergoes expansion. As such, the two gas chambers 116, 118 act in opposing ways as in other embodiments. Reference can be made to Cao, D., Rakheja, S. and Su, C.-Y. (2007) Roll plane analysis of a hydro-pneumatic suspension with twin-gas-chamber struts. Int. J. of Heavy Vehicle Systems, 14, p. 355-375 and Cao, D., Rakheja, S. and Su, C.-Y. (2008) Pitch plane analysis of a twin-gas-chamber strut suspension. IMechE J. of Automobile Engineering, 222, p. 1313-1335, both of which are incorporated herein by reference, with regard to hydro-pneumatic suspensions.

This hydro-pneumatic suspension system also includes a regulating subsystem 120 similar to that employed for the pneumatic suspension system presented in FIG. 1. In particular, a high-pressure gas supply 122 together with regulators/servo valves 124 and shut-off valves 126 are controlled by a controller 128 to tune the gas volume and pressure of each gas chamber 116, 118 so as to achieve desirable suspension stiffness characteristics as well as vehicle ride-height, subject to different operating conditions.

(3) Interconnected Pneumatic Suspension (IPS) System

Figure 5:
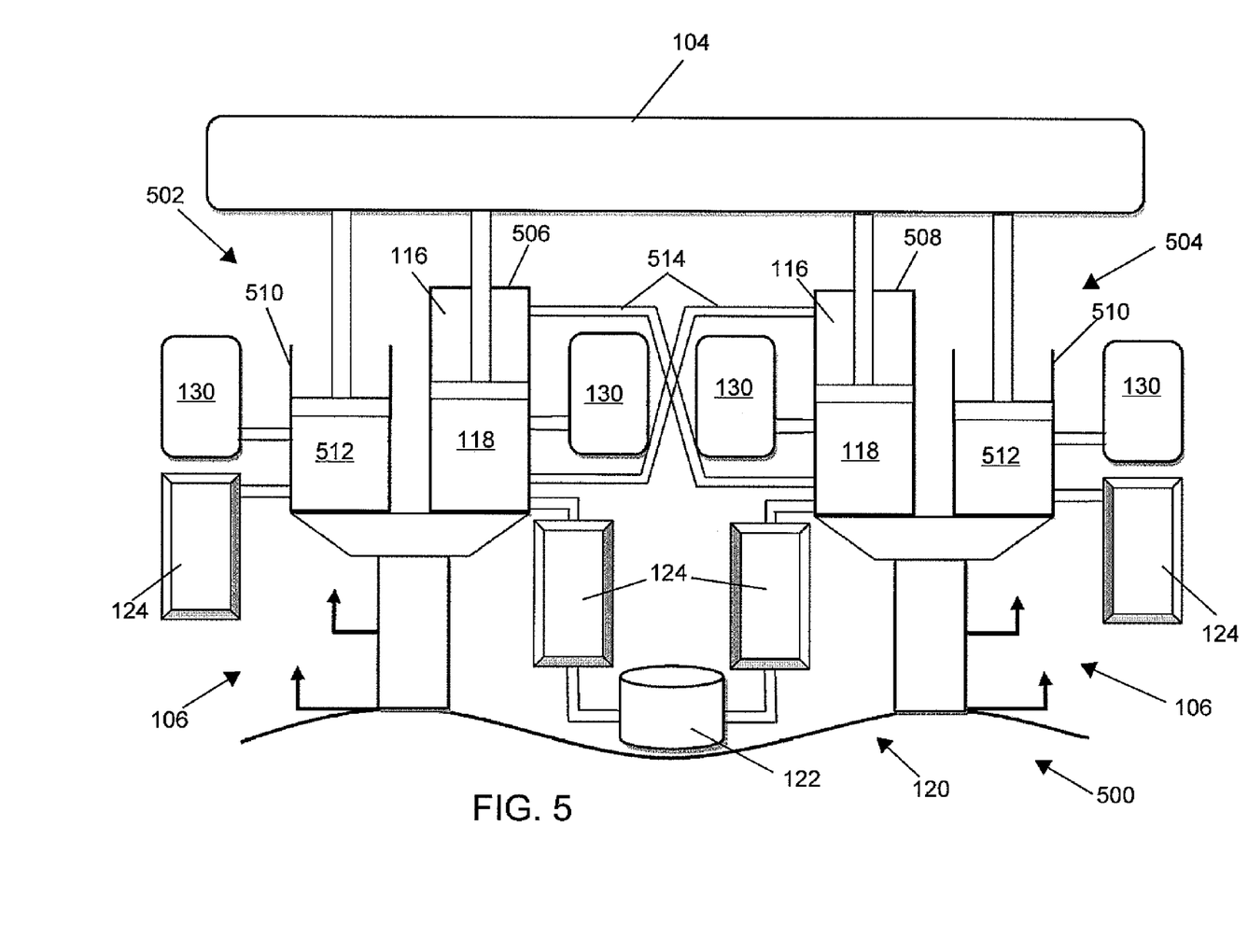
FIG. 5 is a schematic of a suspension system according to still yet another embodiment herein.

FIG. 5 schematically illustrates an embodiment of an interconnected pneumatic suspension system 500 based on a vehicle roll-plane representation. The interconnected pneumatic suspension system 500 includes first and second double pneumatic struts 502, 504 at each of the left and right sides of a vehicle axle. Each of the first and second double pneumatic struts 502, 504 include a double-acting strut 506, 508 that is a double-acting strut with two gas chambers 116, 118, similar to the strut in FIG. 1, and a single-acting strut 510 with a single gas chamber 512, similar to a conventional pneumatic cylinder. The left and right double-acting struts 506, 508 are interconnected with each other via connecting hoses/pipes 514 or the like such that a first gas chamber 116 of the left double-acting strut 506 is connected to a second gas chamber 118 of the right double-acting strut 508, and vice visa. Such interconnections are intended to provide increased roll stiffness without affecting the vertical stiffness property of the suspension. The concept of controlling roll stiffness is discussed in Cao, D., Rakheja, S. and Su, C.-Y. (2008) Dynamic analyses of roll plane interconnected hydro-pneumatic suspension systems. Int. J. of Vehicle Design, 47, p. 51-80, which is hereby incorporated herein by reference. The single-acting struts 510 are arranged to be parallel to the double-acting struts 506, 508 so as to share the vehicle load. Similar to the systems in FIGS. 1 to 4, a regulating sub-system 120 is provided wherein a high-pressure gas supply 122 together with regulators/servo valves 124 and shut-off valves (not shown in FIG. 5) are controlled by a controller (not shown in FIG. 5) to adaptively adjust the gas volume and pressure of each gas chamber 116, 118 so as to achieve desirable suspension stiffness characteristics as well as vehicle ride-height, subject to different operating conditions. As shown in FIG. 5, regulators 124 may also be provided for the single-acting struts 510 to control pressure and volume. Although not shown in FIG. 5, the regulators 124 for the single-acting struts 510 would also be connected to a gas supply. Also similar to above embodiments, accumulators 130 may be added to the single-acting strut 510 and/or one or more of the gas chambers 116, 118 of the double-acting struts 506, 508.

The embodiment in FIG. 5 is intended to provide flexibility in suspension stiffness tuning and considerable benefit in enhancing vehicle roll stiffness and thus vehicle roll stability while also allowing for independently tuning suspension stiffness as well as vehicle ride-height subject to a wide range of complex vehicle operating conditions. The operation and concept are similar to the embodiment shown in FIG. 1.

Figure 6:
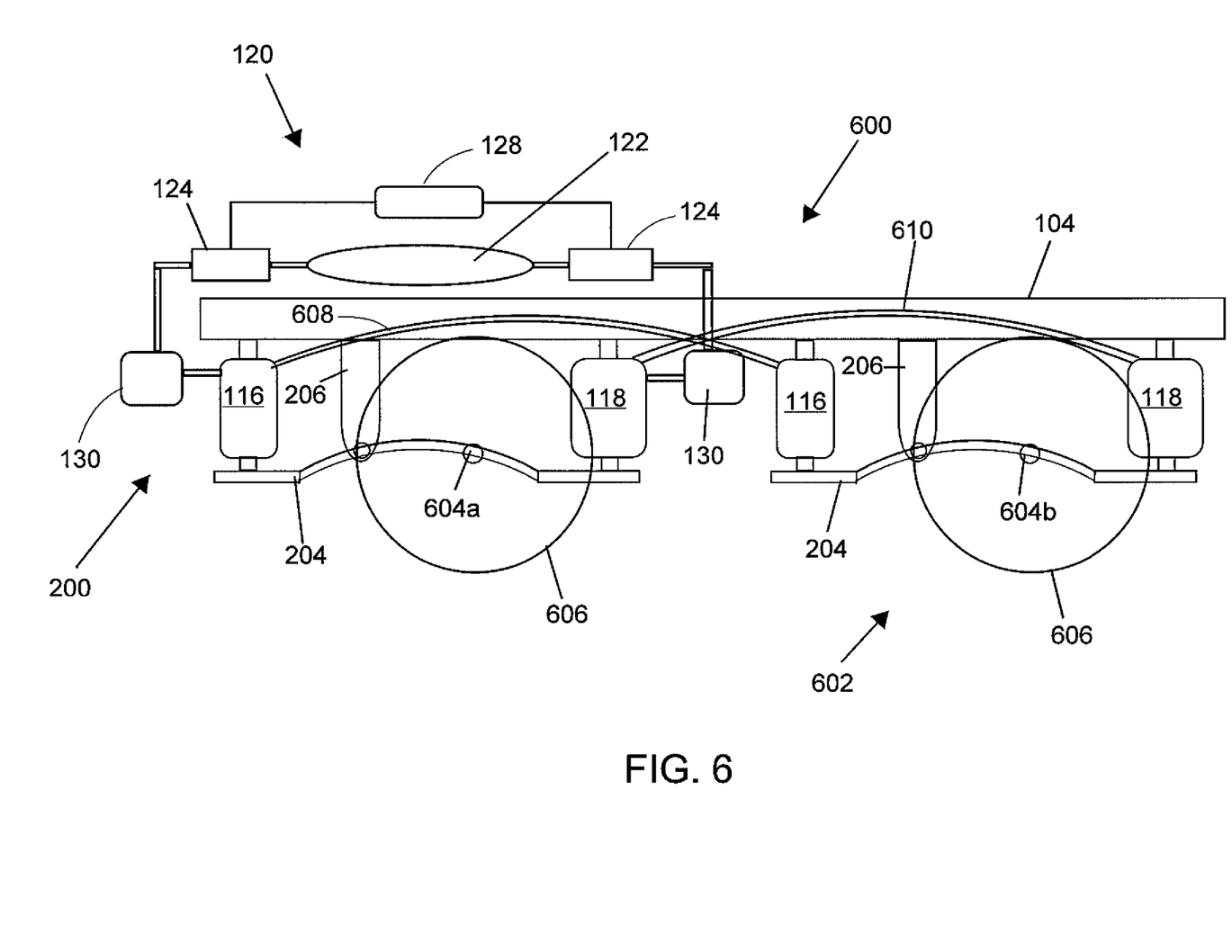
FIG. 6 is a schematic of a suspension system according to still yet another embodiment herein.

FIG. 6 schematically presents an embodiment of an interconnected pneumatic suspension system 600 for a tandem-axle system 602. The tandem-axle system 602 includes two axles 604*a*, 604*b* with wheels 606. For each axle 604 of the tandem-axle system 602, a pneumatic suspension system 200, similar to that presented in FIG. 2 is used. Only a portion of the two pneumatic suspension systems 200 is shown in FIG. 6 but it will be understood by one of skill in the art how the system 200 will be applied. In this embodiment, there is a pneumatic connection 608 between each of the first air spring 116 on the first axle 604*a* and the first air spring 116 on the second axle 604*b* as well as between the second air spring 118 on the first axle 604*a* and the second air spring 118 on the second axle 604*b*, so as to realize an even load distribution on the two axles. Again, the intended independent stiffness and ride-height tuning capability is provided by the regulating sub-system 120 including a high-pressure gas supply 122, regulators/servo valves 124, a controller 128 and the like, as described in reference to FIG. 2.

Features of the systems and methods herein are intended to include:

(i) Suspension stiffness control by adjusting the pressures of the opposing pneumatic gas chambers (ii) Height control implementation by controlling the volume of gas in each chamber.

(iii) Independent control of the stiffness and ride height with minimal energy consumption.

(iv) System integration of both stiffness and ride height control.

Embodiments herein and the ability to adjust stiffness are intended to enhance the relative or absolute dynamics of load and support bodies with respect to each other. In particular, this may be used to affect such characteristics as, but not limited to: vibration isolation, force transmission, noise reduction, vehicle ride handling, roll stability and safety, road-holding, road friendliness, ride height, and energy consumption.

The systems and methods described herein are intended to provide a class of adaptive fluidic (including pneumatic and hydro-pneumatic) suspension systems that are capable of independently tuning suspension stiffness and load-height characteristics, corresponding to different operating conditions. When applied to vehicles, the embodiments of road-adaptive suspension systems are intended to improve on existing compromises among different vehicle dynamics and stability performance measures, with much less energy consumption compared to fully-active suspensions. In addition to the effective volume and piston area, air pressure in a pneumatic spring is a key factor that determines the overall suspension stiffness. In a conventional single-chamber pneumatic spring, the pressure is generally not controllable and is determined only by load. Embodiments herein provide systems and methods that employ a dual-chamber approach, and add a regulation sub-system so that the chamber pressures can be adaptively adjusted as new design parameters. Thus, instead of introducing extra volume to adjust stiffness, it is possible to vary the stiffness by controlling pressures of cylinder chambers independent from just adding extra volume, which impacts the ride height control. In addition, the ride height control is achieved without an extra height control system because the regulators are also able to operate simultaneously to adjust the amount of air that enters into each chamber so that the piston position (thus vehicle ride height) can be controlled.

The embodiments of the fluidic suspension systems herein are intended to be capable of controlling both stiffness and ride height independently, thus overcoming at least some of the disadvantages of conventional systems. Moreover, no extra height control components are needed, which leads to a relatively simpler, compact system.

Pneumatic Suspension System Testing

Figure 7:
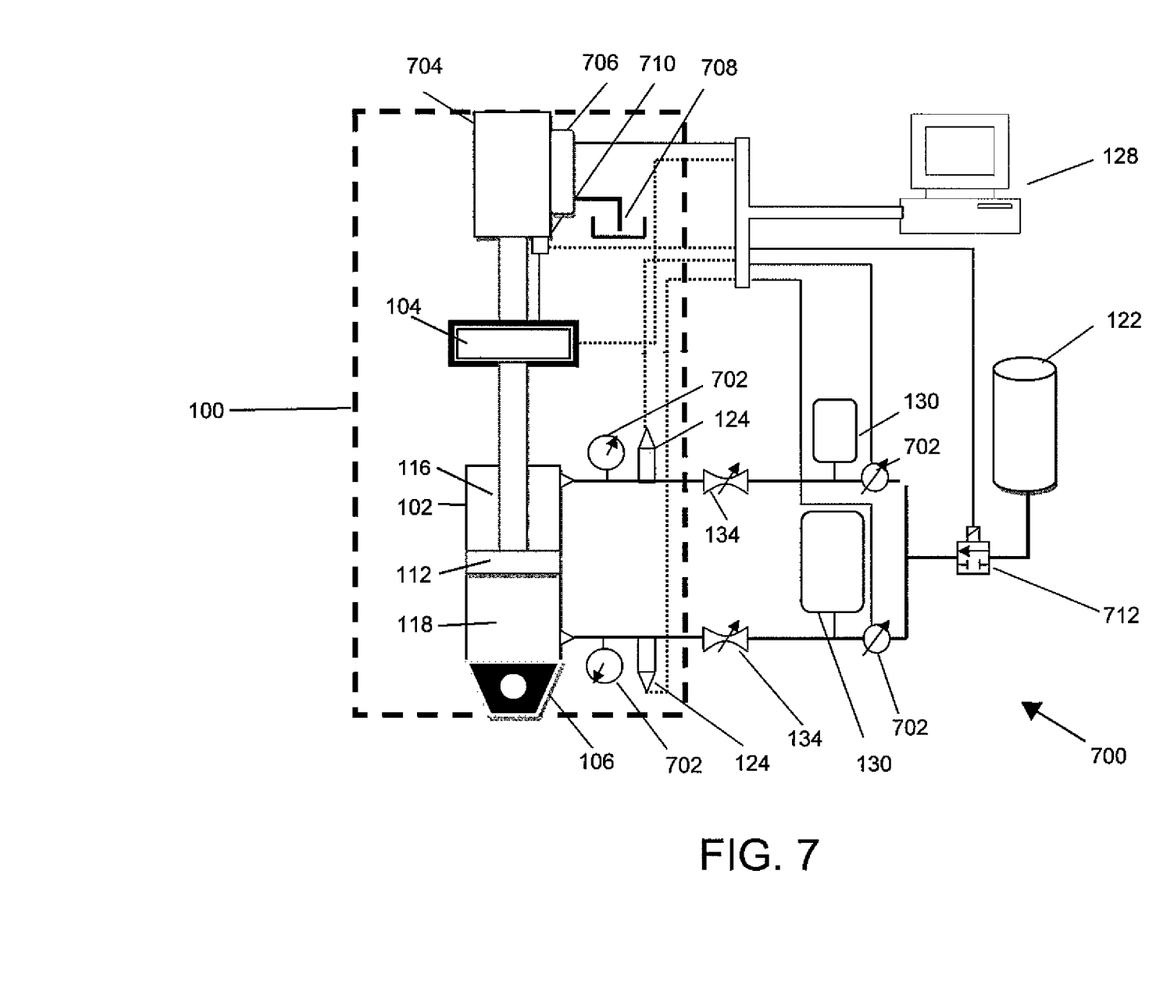
FIG. 7 is a schematic of an experimental suspension system for testing at least some embodiments herein.

In order to verify the feasibility and modeling of embodiments of the pneumatic suspension system, a prototype has been built and testing conducted. FIG. 7 shows a schematic of the experimental setup of an experimental pneumatic suspension system 700 including a suspension system 100 similar to that described with respect to FIG. 1. In particular, a pneumatic cylinder 102 is provided between a load 104 and support 106 and includes a first/upper chamber 116 and a second/lower chamber 118 and a movable piston 112 separating the chambers 116, 118. The gas pressure in the chambers 116, 118 can be tuned by flow of gas from a gas tank 122 through pressure regulators 124. The suspension system 700 also includes accumulators 130 connected to the gas chambers 116, 118 through a flow valve 134 to control damping. A controller 128 is implemented by a computer that controls the regulators 124 and collects data for analysis. The system 700 also includes pressure gauges 702 for monitoring pressure at various points in the system for use in the analysis/control, a hydraulic cylinder 704 to simulate motion of the load 104, a servo valve 706 and servo valve drain line 708 for controlling the hydraulic cylinder 704, a displacement sensor 710 to measure the motion of the load 104, and a solenoid valve 712 to disconnect the gas tank 122 from the chambers 116, 118.

Figure 8:
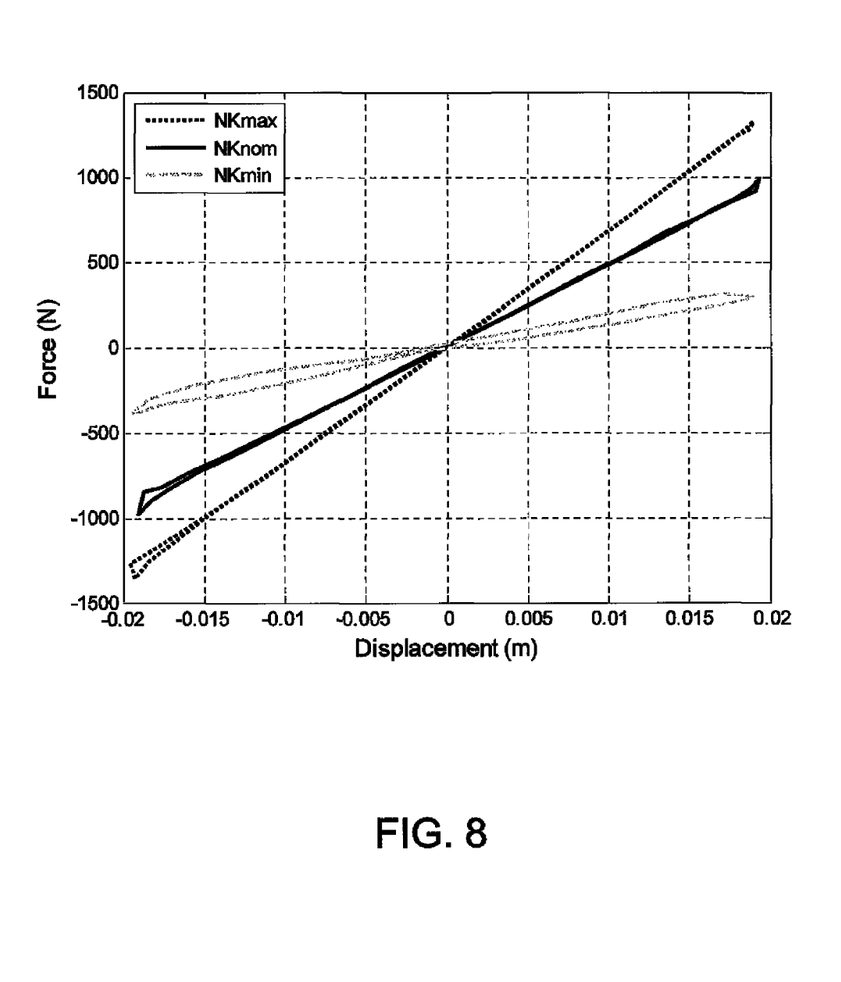
FIG. 8 is a chart showing suspension force vs. displacement at nominal ride-height using the experimental suspension system of FIG. 7.
Figure 9:
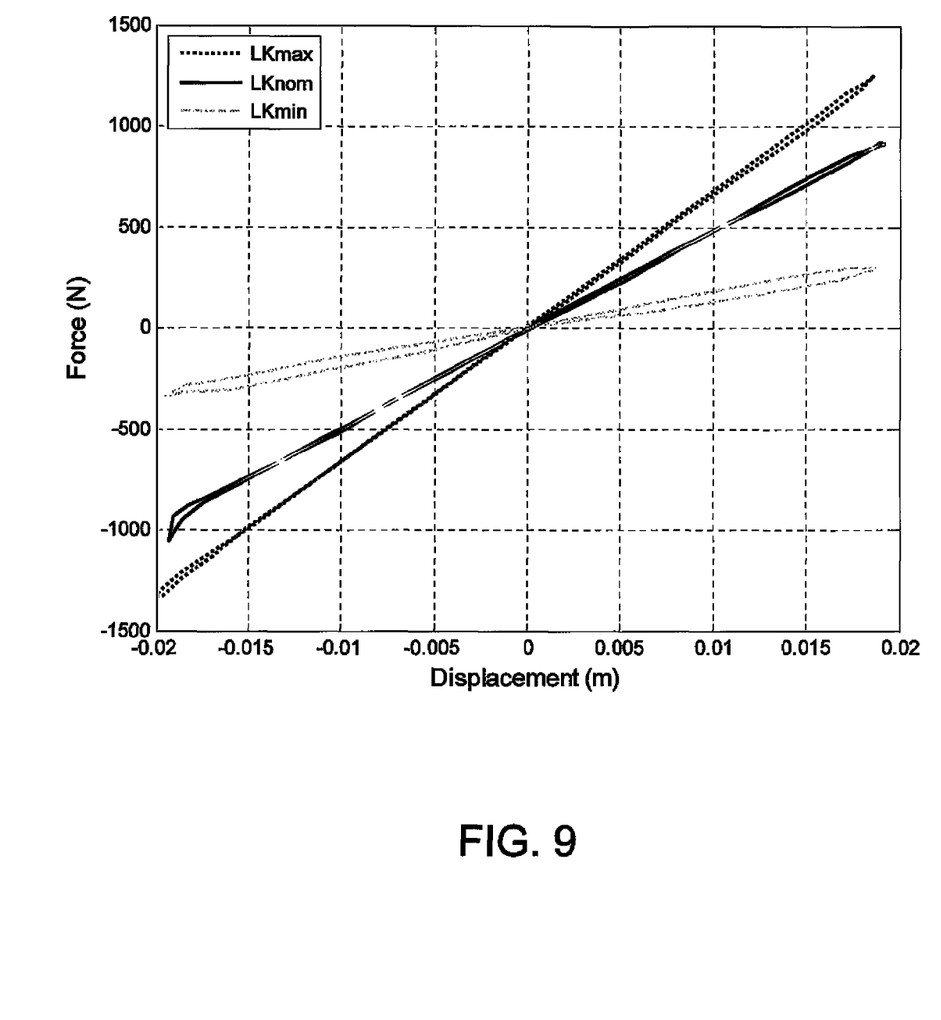
FIG. 9 is a chart showing suspension force vs. displacement at an alternate ride-height to that of FIG. 8.
Figure 10:
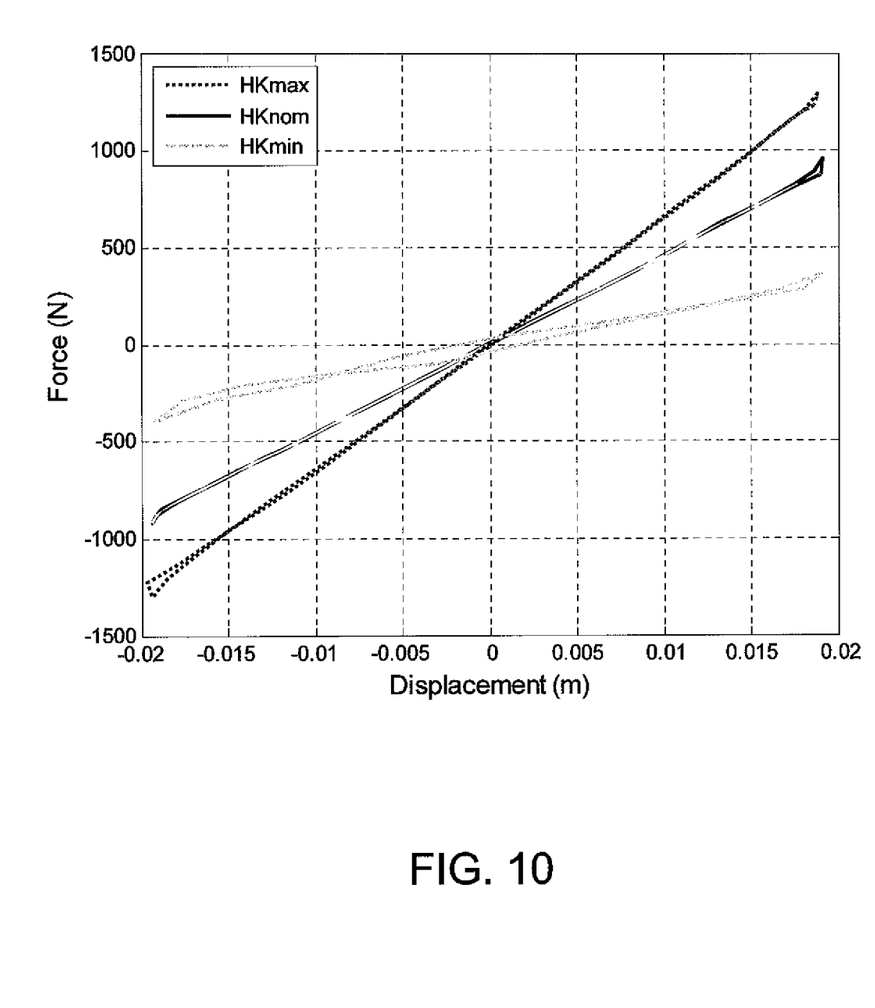
FIG. 10 is a chart showing suspension force vs. displacement at another alternate ride-height to that of FIG. 8.

FIGS. 8 to 10 show suspension force vs. displacement at three different ride heights, considered using the experimental pneumatic suspension system 700 of FIG. 7. The differing ride heights are provided by adjusting the volume of air in each chamber of the pneumatic cylinder 102. FIG. 8 shows the results at a nominal position (nominal ride height). The three curves with different slopes indicate that at this nominal position, by controlling the pressures of the two chambers, suspension stiffness can be varied easily. In the experiment conducted, the suspension stiffness can be adjusted from 16 KN/m to 67 KN/m at nominal height. The pressure of the upper chamber varies from 1.25 bar to 18.8 bar, while pressure of the lower chamber varies from 7.6 bar to 21.26 bar. Similarly, FIGS. 9 and 10 present the suspension stiffness tuning flexibility at lower and higher ride height options, respectively.

The results shown in FIGS. 8 to 10 indicate that the embodiment of the pneumatic suspension system shown in FIG. 7, which is an experimental implementation of Embodiment shown in FIG. 1, is able to tune the stiffness and ride-height independently.

It will be understood that the systems described above also provide a basis for a method of independently adjusting suspension stiffness and distance between two bodies, in particular between a load and a support such as the situation in vehicles. In particular, the method may include: providing a first pressure chamber and at least one other pressure chamber between the bodies such that the at least one other pressure chamber opposes the action of the first pressure chamber; adjusting the pressure in the first pressure chamber and the at least one other pressure chamber to adjust the suspension stiffness; and adjusting the volume of the first pressure chamber and the at least one other pressure chamber to adjust the distance between the bodies. It will be understood that the pressure and volume of a gas are inter-related properties and that a change in each property can result in a change in the other property such that, depending on the configuration, a controller or control system can generally make use of either property to produce an appropriate result.

In the preceding description, for purposes of explanation, numerous details are set forth in order to provide a thorough understanding of the embodiments. However, it will be apparent to one skilled in the art that, in some cases, these specific details may not be required. In other instances, well-known structures may be shown in block diagram form in order not to obscure the understanding.

Embodiments herein may include a computer program product (software) stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A suspension system between two bodies, the suspension system comprising:
   a first pressure chamber provided between the bodies; and
   at least one other pressure chamber provided between the bodies such that the at least one other pressure chamber opposes the action of the first pressure chamber;
   a lever, wherein the first pressure chamber and the at least one other pressure chamber are positioned on opposite sides of the lever and the lever and the first pressure chamber and the at least one other pressure chamber are positioned between the two bodies such that the lever pivots in relation to at least one of the two bodies; and
   a control system configured to independently control the pressure and volume in the first pressure chamber and the at least one other pressure chamber to independently adjust the stiffness value of the suspension system and distance between the bodies.

2. The suspension system of claim 1 wherein the first pressure chamber and the at least one other pressure chamber are pneumatic chambers and the control system comprises at least one regulator and a gas supply for controlling the pressure and volume in the pneumatic chambers.

3. The suspension system of claim 1 wherein the suspension system further comprises:
a gas accumulator; and
a valve for controlling the flow of gas between the pressure chamber and the gas accumulator for damping motion of the two bodies.

4. The suspension system of claim 3 wherein the valve comprises a variable valve controlled by the control system to adjust the dampening characteristics according to desired performance.

5. The suspension system of claim 1 further comprising:
a sensor in communication with the first pressure chamber and the at least one other pressure chamber for detecting pressure values; and
wherein the control system further monitors the detected pressure values and determines an appropriate pressure and volume for each pressure chamber to independently achieve a desired stiffness value and nominal distance between bodies for the suspension system.

6. A suspension system between two bodies, the suspension system comprising:
first and second opposing-action suspensions, each of the first and second opposing-acting suspensions comprising:
a first pressure chamber provided between the bodies; and
at least one other pressure chamber provided between the bodies such that the at least one other pressure chamber opposes the action of the first pressure chamber;
a lever, wherein the first pressure chamber and the at least one other pressure chamber are positioned on opposite sides of the lever and the lever and the first pressure chamber and the at least one other pressure chamber are positioned between the two bodies such that the lever pivots in relation to at least one of the two bodies; and
a control system configured to independently control the pressure in the first pressure chamber and the at least one other pressure chamber.

7. The suspension system of claim 6 wherein the first pressure chamber of the first opposing-action suspension is fluidically connected with the at least one other pressure chamber of the second opposing-action suspension and the first pressure chamber of the second opposing-action suspension is fluidically connected with the at least one other pressure chamber of the first opposing-action suspension.

8. The suspension system of claim 6 wherein the first pressure chamber of the first opposing-action suspension is fluidically connected with the first pressure chamber of the second opposing-action suspension and the at least one other pressure chamber of the first opposing-action suspension is fluidically connected with the at least one other pressure chamber of the second opposing-action suspension.

9. The suspension system of claim 6, wherein the first and second opposing-action suspensions are positioned in relation to the bodies and interconnected to provide control of roll or pitch of the bodies in relation to each other.

\* \* \* \* \*